Oct. 22, 1963 E. SCHMOOK, JR 3,107,392
METHOD OF FORMING CASING STUFFED PRODUCTS
Filed Aug. 29, 1960
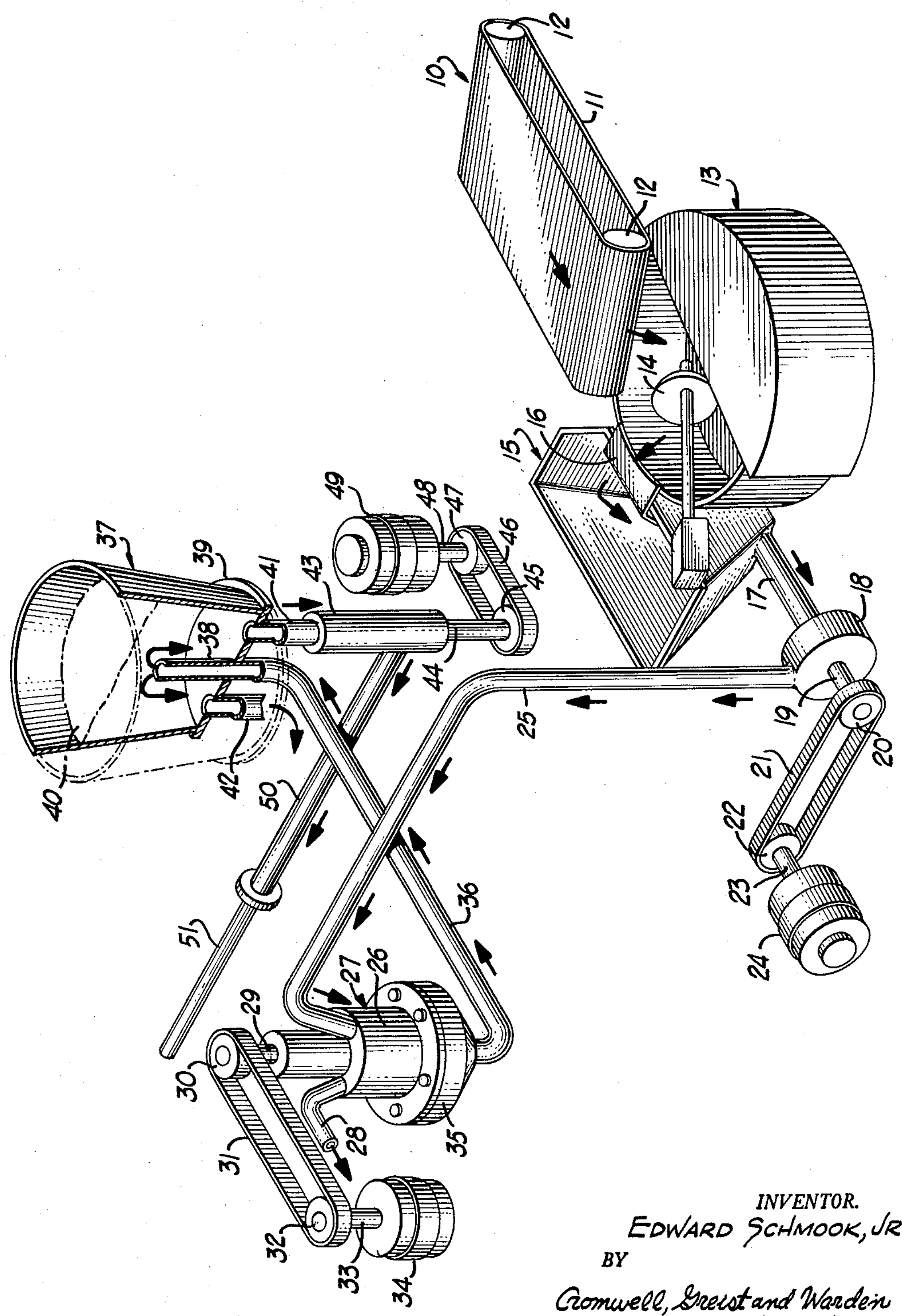
INVENTOR.
EDWARD SCHMOOK, JR.
BY
Cromwell, Greist and Warden
ATTORNEYS.

United States Patent Office 3,107,392

Patented Oct. 22, 1963

3,107,392

METHOD OF FORMING CASING STUFFED PRODUCTS

Edward Schmook, Jr., Madison, Wis., assignor to Oscar Mayer & Company, Inc., Chicago, Ill., a corporation of Illinois Filed Aug. 29, 1960, Ser. No. 52,428
6 Claims. (Cl. 17—45)

The present invention relates to a new and improved method for forming casing stuffed meat products, such as wieners, bologna, etc., and to a special operational system particularly adapted for carrying out the method. More specifically, the invention is directed to a method of forming deaerated casing stuffed food products such as wieners and the like, and a system for commercial use in carrying out the method, the method and system being particularly adapted for continuous operation in at least substantially an automatic manner.

Procedures followed in the commercial production of stuffed meat products, such as wieners, bologna and the like, have been practiced for many years with relatively few basic modifications or innovations being made thereto. The batter formulation, comminution and casing stuffing procedures have been batchwise operations each requiring a substantial amount of at least semi-skilled labor. Batchwise handling of meat batter is undesirable not only from the time-cost aspects thereof, but is also deleterious to the appearance and condition of the meat product itself. Preparation and conditioning of the meat batter in the presence of air tends to create volumetric non-uniformity as well as oxidative discoloration of the meat. The occlusion of air in the batter creates pockets or voids therein which may well be retained during the casing stuffing operation and thus be present in the final product. This promotes volumetric and weight non-uniformity in the stuffed product and the occluded oxygen-bearing air will act to cause meat discoloration and other undesirable results.

Attempts have been made to reduce the effects of the foregoing disadvantages of batchwise meat preparation and stuffing operations. Meat batter has been prepared under vacuumization conditions or in the presence of an inert gas such as nitrogen. The use of an atmosphere of inert gas does not eliminate the volumetric and weight non-uniformity problem and the advantageous effects of vacuumization have largely been destroyed due to the necessity of continued batchwise handling of the batter following vacuumization preparation thereof. The stuffing operation is non-continuous, as with the use of conventional stuffing horns receiving a casing thereabout it is necessary to discontinue stuffing during casing replacement. Thus the batchwise operational aspects of stuffing results in an accumulation of meat batter which is often exposed to air for a rather substantial period of time.

It is an object of the present invention to provide a new and improved method and system for use in forming deaerated casing stuffed products.

A further object is to provide a new and improved method of forming deaerated casing stuffed food products, the method comprising the vacuumization of batter ingredients during batter preparation and the maintaining of the advantages obtained from vacuumization during subsequent handling and stuffing of the batter.

Still a further object is to provide a new and improved system for preparing and continuously supplying deaerated meat batter for stuffing thereof, the system comprising the combination of specially adapted batter handling means which cooperatively function to establish and maintain vacuumization conditions in the batter while accommodating continuous or batchwise stuffing operations thereof.

Still a further object is to provide a new and improved method of obtaining and maintaining deaerated meat batter conditions during the preparation and stuffing of the batter, the method including the utilization of a submerged batter feeding principle for batter accumulation purposes, it being still a further object to provide a new and improved batter preparation and handling system which is particularly adapted for carrying out the method of the present invention.

Other objects not specifically set forth will become apparent from the following detailed description of the invention made in conjunction with the accompanying drawing which diagrammatically illustrates a preferred batter preparation and handling system capable of carrying out the method of the invention and also forming a part thereof.

In first considering the basic aspects of the method of the present invention, this method in the forming of deaterated casing stuffed food products involves the comminution of coarse food material under vacuumization conditions during which occluded air is removed from the material as the particles thereof are subdivided. The comminuted material is delivered in the absence of air and preferably while still subject to the vacuumization conditions of the comminution step into a material accumulation zone which may preferably be in the form of a hopper-type means and which is open to the atmosphere for material observation and ready cleaning thereof. The introduction of the material into the accumulation means occurs below the surface of material previously accumulated therein and which is exposed to the atmosphere. This aspect of the invention involves the principle of "submerged feeding" as will be described in greater detail. The accumulated material is withdrawn from the accumulation means at a point well below the exposed surface of the material therein such that the withdrawn material is still in a completely vacuumized state. The withdrawn material is then directly stuffed into casings while being protected from aeration.

The system of the present invention, an embodiment of which is diagrammatically illustrated in the accompanying drawing, is designed for preparing and continuously supplying deaerated food material for stuffing thereof. The system includes among other things a continuously operating comminution means receiving a food or meat preparation therein. The comminution means is sealed from the atmosphere and includes vacuumization means in communication therewith to deaerate the meat preparation undergoing comminution. The discharge of the comminution means is connected to delivery means which continuously delivers comminuted meat preparation to a batch-type hopper. The delivery means is completely sealed from the atmosphere and is in communication with the interior of the hopper (which is open to the atmosphere) at a point below the surface of meat preparation already accumulated therein. Thus meat preparation is continuously delivered into the batch-type hopper means utilizing the principle of "submerged feeding" to protect the meat preparation from aeration during accumulation or what might otherwise be referred to as storage thereof. Additional delivery means closed to the atmosphere is in communication with the hopper means to deliver meat preparation therefrom to a stuffer for continuous or periodic casing stuffing thereof. The further delivery means is maintained in communication with the hopper means at a point below the surface of meat preparation accumulated therein to take advantage of the air seal established by the meat preparation itself in the hopper means.

The accompanying drawing is a diagrammatic illustration of a special system capable of carrying out the method of sausage-type meat preparation of the invention.

Referring to the accompanying drawing, a description of an embodiment of the system of the present invention will provide for a better understanding of the basic principles of the method of the invention. The system illustrated includes a conveyor 10 which may be of any suitable type such as an endless belt 11 extending over a pair of rollers 12, one of which is driven. The conveyor 10 receives thereon coarse pieces or chunks of meat to be used in batter preparation as well as any additional ingredients such as condiments and the like. The conveyor may preferably be a scale conveyor of known type by means of which formulation of batches of meat preparation can be continuously made. In other words, the various ingredients in batchwise measured amounts may be deposited on the belt 11 during continuous movement thereof.

Each batch of batter ingredients is continuously delivered by the conveyor 10 into a coarse chop means in the form of a silent cutter 13 in which the meat chunks are chopped and the ingredients are thoroughly mixed. The silent cutter 13 is of known type and includes an unloader 14 used in the usual manner in removing coarsely chopped batter from the cutter 13.

The coarsely chopped meat preparation is delivered from the silent cutter 13 by means of the unloader 14 into a first hopper means constituting a feed hopper 15 of any suitable design. The hopper 15 as shown in the drawing may be suitably associated with the silent cutter 13 by means of a bridging plate 16 which extends over adjacent edge portions of the units and over which the meat preparation is delivered from the cutter 13 to the hopper 15 by the unloader 14. The hopper 15 is open at the top and it will be understood that the meat preparation is subject to atmospheric conditions and has air occluded therein.

Coarsely chopped meat preparation is accumulated in the hopper 15 to a rather substantial extent to provide an adequate source for continuous operation of the comminution means forming a part of the system. Suitably connected to the hopper adjacent the bottom thereof is a meat preparation discharge pipe 17 through which meat preparation is removed from the hopper 15 by means of a pump 18. The pump 18 is diagrammatically illustrated and as shown includes a drive shaft 19 having a pulley 20 attached thereto and driven by a belt 21 operated by a pulley 22 attached to the drive shaft 23 of a suitable motor or power source 24. Preferably, the pump 18 will be in the form of a Moyno pump of well known type which applies to the meat preparation a progressing cavity type action to impart motion thereto for delivery purposes without destructive action on the meat particles of the preparation.

A line 25 delivers meat preparation from the pump 18 in the direction of the arrows associated therewith into the comminution zone 26 of a continuous chopper generally designated by the numeral 27. The chopper 27 is preferably of the type disclosed in my co-pending application Serial No. 27,105, filed May 5, 1960. A chopper of this type is designed for the continuous comminution of meat being delivered thereinto in a steady stream, the comminution occurring as a result of high speed rotation of a knife assembly with the combined action of centrifugal force and gravity forming a continuous downwardly moving relatively thin sleeve of accumulated meat along the inner surface of the barrel of the comminution zone 26. During comminution the meat preparation is subjected to vacuumization conditions established by vacuumization of the chopper assembly 27 with air being withdrawn therefrom through a line 28 in the direction of the arrow associated therewith by means of a suitable vacuum pump or the like (not shown).

The rotating knife assembly of the chopper 27 is driven by a shaft 29 extending upwardly from the top of the chopper 27 and to which a drive pulley 30 is attached and driven by a belt 31. The belt 31 is driven by a pulley 32 attached to the drive shaft 33 of a suitable motor or power source 34. Obviously, any suitable drive means may be utilized and the particular means illustrated is merely indicative of the type of operation obtained.

The forming of the thin sleeve of meat during comminution thereof as described above materially enhances adequate or complete deaeration of the preparation to remove deleterious oxygen-bearing air which is occluded therein as a result of earlier handling and preparation of the ingredients. A vacuum seal in the chopper 27 is maintained at the meat preparation delivery end by reason of the maintenance of an accumulation of meat preparation in the hopper 15 and the continuous delivery of meat preparation therefrom to the chopper 27 through the line 17, pump 18, and line 25. Thus during operation of the system the delivery lines and feed pump are full of meat preparation at all times.

The comminuted and deaerated meat preparation, now in completed batter form, is continuously delivered from the comminution zone 26 of the chopper 27 into a batter discharge zone 35 forming a part of the chopper 27. As disclosed in my aforementioned application, the discharge zone 35 is in the form of a rotating bowl which rotates with the knife assembly of the comminution zone 26 with the result that batter delivered thereinto is accumulated by centrifugal force along the inner surface of the bowl. A stationary pick-up discharge tube (not shown) is received within the bowl and scoops out batter therefrom for continuous discharge through line 36 from the chopper 27. High speed rotation of the accumulated batter in the rotating bowl of the zone 35 of the chopper provides adequate discharge force whereby the batter is continuously moved through the line 36 into a submerged feeding hopper-type unit 37.

Comminuted batter is continuously delivered into the hopper unit 37 from the line 36 through a standpipe portion 38 which projects upwardly into the center of the hopper 37 through the bottom plate 39 thereof. As indicated by the arrows associated with the upper end of the standpipe portion 38, comminuted batter spills over into the hopper 37 and accumulates therein preferably to the extent indicated by the diagrammatic showing of batter in the drawing. When the system is initially placed in operation, comminuted batter is permitted to accumulate in the hopper 37 until the standpipe portion 38 is completely sealed off from the atmosphere. Although the hopper 37 is open to the atmosphere at the top thereof, only the top surface portion 40 of the accumulated batter therein is exposed to air. The remaining amount of batter accumulated in the hopper 37 is completely protected against aeration by the top surface portion 40 and in this manner the advantages of deaeration are maintained.

The hopper 37 is generally referred to as the stuffing hopper unit as it functions to maintain an accumulated supply of finished batter for continuous or periodic stuffing thereof in casings. The bottom plate 39 of the hopper 37 also receives therein a plurality of discharge lines 41 and 42. These lines individually deliver batter to stuffing horns which are of known type and which are operated in the known manner. Any number of discharge lines may be used with a single stuffing hopper unit and the operational use of only one line 41 is diagrammatically illustrated in the drawing, it being understood that the line 42 is connected with similar equipment for use in the same manner.

The discharge line 41 communicates with a suitable feed pump 43 (preferably of the Moyno type) which is driven by a shaft 44 having a drive pulley 45 connected thereto. A drive belt 46 engages the pulley 45 and is driven by a pulley 47 attached to the drive shaft 48 of a suitable motor or power source 49. Batter is moved by pump 43 from the hopper 37 through a line 50 in the direction of the arrows associated therewith and into a stuffing horn 51 of known type. The stuffing horn normally has received thereabout an empty conventional casing (not shown) into which the batter is forced with the casing being filled, subsequently subdivided into links and tied off in accordance with conventional practices.

As previously described, the comminuted batter is continuously delivered through line 36 into the stuffing hopper 37. The introduction of the batter into the hopper makes use of "submerged feeding" once the system is in full operation. By this it is meant that the deaerated batter is protected against aeration during accumulation in the hopper 37 by being introduced thereinto below the top surface portion 40 of material previously accumulated therein. In this manner the batter is sealed against aeration and subsequent removal thereof from the hopper 37 through the line 41, pump 43 and line 50 does not result in aeration and the batter is completely uniform from the standpoint of weight and volume and is in good condition with regard to color, etc. when the same is forced into a casing through the stuffing horn 51. Preferably, the batter is delivered into the hopper 37 below the top surface portion 40 of the batter accumulated therein and well above the bottom of the hopper with the batter being withdrawn from the hopper 37 at points below the point of delivery thereof into the hopper 37 to meet "first in-first out" requirements. The substantial amount of batter accumulated in the hopper 37 forms a complete air seal relative to the various parts of the system in communication with the hopper. Thus the batter actually being used for casing stuffing is completely protected against aeration following deaeration thereof during comminution. The basic structural features of the stuffing hopper unit 37 diagrammatically illustrated in the drawing constitute a separate invention specifically covered in a co-pending application.

From the foregoing description of the method and system of the present invention, it will be appreciated that the system is operable in a continuous manner with the material handled thereby being automatically vacuumized and protected against aeration. The system is designed to accommodate periodic operation of any number of stuffing horns forming a part thereof as it will be understood that individual stuffing horns must be closed periodically for casing replacement. Thus the system permits continuous operation of the chopper 27 for full utilization of the advantages of such operation with accompanying deaeration and protection against subsequent aeration. The stuffing hopper 37 is open at the top to meet specified periodic cleaning requirements.

As an example of advantages obtained by use of the system of the present invention and involving inherent use of the method thereof, a single chopper 27 may continuously and automatically supply a rather substantial number of stuffing horns through the use of a single stuffing hopper unit 37. The chopper is capable of producing emulsified wiener or bologna batter at a flow rate up to 150 lbs. per minute. Preferably, the vacuum applied in the chopper is maintained at or above 25 inches of mercury.

Obviously certain modifications and variations of the invention as hereinbefore set forth may be made without departing from the spirit and scope thereof, and therefore only such limitations should be imposed as are indicated in the appended claims.

I claim:

1. A method of forming deaerated casing stuffed food products, said method comprising comminuting coarse food material under vacuumization conditions during which occluded air is removed from the material as particles of the same are subdivided, delivering the comminuted material into hopper-type material accumulation means which is open to the atmosphere for material observation and ready cleaning thereof, the delivery of said material being carried out in the absence of air, the introduction of said material into said accumulation means occurring below the surface of material therein which is exposed to the atmosphere, and at least periodically withdrawing material from said accumulation means from below the exposed surface of accumulated material therein, said withdrawn material being stuffed in casings while protected from aeration.

2. A method of forming deaerated casing stuffed food products, said method comprising comminuting coarse food material under vacuumization conditions during which occluded air is removed from the material as particles of the same are subdivided, delivering the comminuted material into hopper-type material accumulation means which is open to the atmosphere for material observation and ready cleaning thereof, the delivery of said material being carried out in the absence of air and subject to the vacuum conditions of comminution, the introduction of said material into said accumulation means occuring below the surface of material therein which is exposed to the atmosphere but well above the lowermost quantity of material previously accumulated therein, and at least periodically withdrawing material from said accumulation means from below the area of introduction of comminuted material thereinto, said withdrawn material being stuffed in casings while protected from aeration.

3. A method of forming deaerated casing stuffed meat products, said method comprising continuously delivering coarsely chopped meat preparations into a comminution zone which is sealed from the atmosphere and comminuting said preparations therein, maintaining said comminution zone under vacuumization conditions for deaeration of said meat preparations during comminution thereof, continuously removing comminuted product from said comminution zone through a system closed to the atmosphere and functioning as a vacuum seal for said comminution zone, continuously delivering product into hopper means in which said product accumulates for subsequent stuffing thereof, the introduction of said product into said hopper means occurring below the surface of product accumulated therein with the surface portion of accumulated product providing a seal against aeration, and at least periodically withdrawing product from said hopper means below the surface of product accumulated therein for stuffing thereof in casings.

4. A method of forming deaerated casing stuffed meat products, said method comprising continuously delivering coarsely chopped meat preparations into a comminution zone which is sealed from the atmosphere and comminuting said preparations therein, maintaining said comminution zone under vacuumization conditions for deaeration of said meat preparations during comminution thereof, continuously removing comminuted product from said comminution zone through a system closed to the atmosphere and functioning as a vacuum seal for said comminution zone, continuously delivering product into hopper means in which said product accumulates for subsequent stuffing thereof, the introduction of said product into said hopper means occurring at a point below the surfact of product accumulated therein with the surface portion of accumulated product providing a seal against aeration, and at least periodically withdrawing product from said hopper means below the surface of product accumulated therein and below the point of introduction of product into said hopper means for stuffing thereof in casings.

5. A method of forming deaerated casing stuffed meat products, said method comprising coarsely chopping batchwise preparations of meat pieces, accumulating said preparations in first hopper means, continuously delivering said meat preparations from said first hopper means into a comminution zone which is sealed from the atmosphere and comminuting said preparations therein, maintaining said comminution zone under vacuumization conditions for deaeration of said meat preparations during comminution thereof, continuously removing comminuted product from said comminution zone through a system closed to the atmosphere and functioning as a vacuum seal for said comminution zone, continuously delivering product into further hopper means in which said product accumulates for subsequent stuffing thereof, the introduction of said product into said further hopper means occurring below the surface of product accumulated therein with the surface portion of accumulated product providing a seal against aeration, and at least periodically withdrawing product from said further hopper means below the surface of product accumulated therein for stuffing thereof in casings.

6. A method of forming deaerated casing stuffed meat products, said method comprising coarsely chopping batchwise preparations of meat pieces, accumulating said preparations in first hopper means, continuously delivering said meat preparations from said first hopper means into a comminution zone which is sealed from the atmosphere and comminuting said preparations therein, maintaining said comminution zone under vacuumization conditions for deaeration of said meat preparations during comminution thereof, continuously removing comminuted product from said comminution zone through a system closed to the atmosphere and functioning as a vacuum seal for said comminution zone, continuously delivering product into further hopper means in which said product accumulates for subsequent stuffing thereof, the introduction of said product into said further hopper means occurring at a point below the surface of product accumulated therein with the surface portion of accumulated product providing a seal against aeration, and at least periodically withdrawing product from said further hopper means below the surface of product accumulated therein and below the point of introduction of product into said further hopper means for stuffing thereof in casings.

References Cited in the file of this patent

UNITED STATES PATENTS

| | | |
|---|---|---|
| 1,505,218 | Sartore | Aug. 19, 1924 |
| 2,681,279 | Sloane et al. | June 15, 1954 |
| 2,690,970 | Moses | Oct. 5, 1954 |
| 2,889,574 | Thielen et al. | June 9, 1959 |
| 2,977,629 | Grebe | Apr. 4, 1961 |
| 3,034,171 | Rosenthaler | May 15, 1962 |
| 3,042,964 | Rosenthaler | July 10, 1962 |